United States Patent [19] [11] 4,194,919
Hattori et al. [45] Mar. 25, 1980

[54] METHOD FOR INCREASING FLEXURAL STRENGTH OF CEMENT COMPOSITIONS

[75] Inventors: Kenichi Hattori, Musashino; Shinji Iwai, Tokyo; Toshio Okuyama, Yokohama; Yuji Nakagawa, Chigasaki; Takeo Maeda, Kashiwa; Yasuyuki Kawakatsu, Sakai, all of Japan

[73] Assignee: Kao Soap Co., Ltd., Tokyo, Japan

[21] Appl. No.: 891,302

[22] Filed: Mar. 29, 1978

[51] Int. Cl.² .............................................. C04B 7/35
[52] U.S. Cl. ......................................... 106/90; 106/97; 106/98; 106/314
[58] Field of Search ............... 106/90, 97, 98, 314, 106/315; 260/29.65

[56] References Cited

U.S. PATENT DOCUMENTS

| | | | |
|---|---|---|---|
| 3,198,758 | 8/1965 | Donnelly | 106/97 |
| 3,240,736 | 3/1966 | Beckwith | 106/90 |
| 3,793,975 | 2/1974 | Duff | 106/90 |
| 3,853,577 | 12/1974 | Nishida | 106/90 |
| 3,926,886 | 12/1975 | Kelley et al. | 106/90 |

Primary Examiner—James Poer
Attorney, Agent, or Firm—Blanchard, Flynn, Thiel, Boutell & Tanis

[57] ABSTRACT

The flexural strength of hydraulic cement compositions is increased by incorporating water-soluble epoxy resins, aliphatic amines and cement dispersants into cement compositions and hardening the compositions.

8 Claims, No Drawings

METHOD FOR INCREASING FLEXURAL STRENGTH OF CEMENT COMPOSITIONS

BACKGROUND OF THE INVENTION

1. FIELD OF THE INVENTION

The present invention relates to a method for increasing the strength, especially the flexural strength, of a fresh concrete, a cement paste, a mortar or the like (hereinafter referred to as "cement composition"), which comprises incorporating a water-soluble epoxy resin, an aliphatic amine and a cement dispersant into the cement composition and hardening the composition.

2. DESCRIPTION OF PRIOR ARTS

Hardened products of hydraulic cements are generally poor in the flexural strength and the flexural strength at the age of 7 and 28 days is about ⅛ to 1/10 of the compressive strength. Polymer-incorporated cement compositions have heretofore been investigated as products having an increased flexural strength, and known methods for production of these products are roughly categorized into the following 4 types.

(1) Method in which hardened concrete is impregnated with monomer

A molded structure is first prepared from a cement composition, and after the molded structure is completely dried at 160° C., it is impregnated in vacuo with polymerizable monomer such as methyl methacrylate, styrene or the like and a catalyst. Then, the monomer is polymerized by the action of radiation, heat, light or the like. According to this method, good products having high compressive strength and flexural strength can be obtained, but this method is defective in the point that it is impossible to make the products easily at a construction site.

(2) Method in which polymer fibers are mixed in fresh concrete

In this method, the operation of mixing polymer fibers in fresh concrete is very difficult, and a large quantity of water is required for mixing and the amount of entrained air increases accordingly. Further, the adhesion of the polymer fibers to the cement is low and therefore, both the compressive strength and the flexural strength of the products decrease.

(3) Method in which fresh concrete is mixed with polymer emulsion

According to this method, the products having an improved flexural strength can be obtained, but in order to attain a substantial improvement effect, it is necessary to incorporate the polymer emulsion in an amount of at least 15% by weight of the cement. Accordingly, the amount of entrained air increases because the emulsifiers contained in the emulsion entrain air into the products, resulting in a reduction of the compressive strength. Therefore, this is not preferred from the practical of view.

(4) Method in which monomer is mixed in fresh concrete

This method is most preferred but it is not practically applicable because both the compressive strength and the flexural strength are fairly lowered.

SUMMARY OF THE INVENTION

We made various investigations on methods to increase the flexural strength of cement compositions by using monomers and polymers. As a result, it was found that unexpectedly excellent effects can be obtained when water-soluble epoxy resins are incoporated into cement compositions in combination with cement dispersants, namely high formaldehyde condensate of naphthalenesulfonate with formaldehyde and the like. If a water-soluble epoxy resin alone is cured at normal or elevated temperatures or is cured with an aggregate, without hydraulic cement, the hardened products readily collapse when dipped in water. However, when it is incorporated in a cement composition and then cured, the hardened product does not collapse when it is dipped in water.

A composition comprising a water-soluble epoxy resin and hydraulic cement has a higher flexural strength than a cement composition which does not contain a water-soluble epoxy resin, but reduction of the compressive strength cannot be avoided in the case of water curing. However, this reduction of the compressive strength can be fairly prevented by reducing the water content in the cement composition by using a cement dispersant, such as, high formaldehyde condensate of naphthalenesulfonate, in combination with the water-soluble epoxy resin. THe hardened product thus obtained is excellent in toughness and water tightness, and it is considered construed that this cement composition will be suitable for the production of not only ordinary precast concrete products but also overlaying materials such as road pavements in air ports, highways and the like. Moreover, because of the improved water tightness, the composition will be suitable for construction of underwater structures.

It has been found that when a hardened product is prepared from this cement composition by air curing, dissolution of a part of the water-soluble epoxy resin into water, such as is observed in the case of water curing, does not occur at all, and the synergistic effect achieved by the combined use of the water-soluble epoxy resin and the cement dispersant, such as high formaldehyde condensate of naphthalene sulfonate, remarkably improves both the compressive strength and the flexural strength.

As the water-soluble epoxy resin in the present invention, there is preferably employed products obtained by epoxidizing a polyhydric alcohol such as glycerin, diglycerin, polyglycerin, sorbitol, mannitol, trimethylol propane, pentaerythritol or polyethylene glycol and the like while leaving a part of hydroxyl groups unreacted to retain the water solubility.

As the aliphatic amine that is used as a catalyst for curing the epoxy resin in the present invention, there can be mentioned, for example, polyalkylene polyamine type polyvalent amines such as diethylene triamine and triethylene tetramine. When such polyalkyl polyamine type polyvalent amine is incorporated into cement without the water-soluble epoxy resin or cement dispersant no substantial effect of increasing the strength can be attained.

It is preferred that the aliphatic amine be incorporated in an amount of 1 to 1.5 moles per epoxy equivalent of the water-soluble epoxy resin.

The water-soluble epoxy resin is incorporated in the cement composition in an amount of 5 to 30% by weight, preferably 10 to 20% by weight, of the cement. In the case of mortar, it is most preferred that the water-soluble epoxy resin be incorporated in an amount of 8 to 8.5% of the total volume of mortar.

As the cement dispersant, there can be used not only commercially available superplasticizers having a water reduction ratio of at least 20%, such as high formaldehyde condensate of naphthalene sulfonate, formaldehyde condensate of melamine-sulfonate and formaldehyde condensate of creosote oil-sulfonate, but also commercially available ordinary cement dispersants having a water reduction ratio of at least 5%, such as lignin-sulfonate and gluconate. Even if a cement dispersant of the latter type is used, it is possible to obtain a cement composition having good flexural strength and compressive strength. The cement dispersant is incorporated in an amount of 0.1 to 10% by weight of cement.

Examples 1 to 7 described hereinafter were worked under the following experimental conditions.

(1) Mixing and curing conditions (a) Mixing

Cement was mixed with sand for 0.5 minute in the absence of water by means of a mixer, and water or water containing a cement dispersant was added and the composition was stirred at a low speed for 1 minute and subsequently at a high speed for 2 minutes. Then a monomer (prepolymer) was promptly added together with a catalyst and the necessary amount of water and stirring was conducted in the same manner as described above.

Just after mixing, the flow value was measured, and the mixed composition was filled into a mold by using a stamping rod.

(b) Curing

The sample-filled mold was wrapped with polyvinylidene chloride film. The wet curing was thus carried out in a substantially closed system overnight (for about 20 hours). The upper surfaces of the molded specimens were shaved to form a smooth surface, and the one day strength was measured after demolding. After that, other specimens were cured in water ($20° \pm 3°$ C.) and the strength was measured at 7 and 28 days.

In the case of air curing in Examples 6 and 7, after the one day strength of samples formed by air curing was measured as mentioned above, the specimens were allowed to stand in an atmosphere at a temperature of $20° \pm 5°$ C. and a relative humidity of $70 \pm 10\%$ until the measurement of the 7 and 28 days strength.

(2) Test items and conditions (a) Flexural strength

The flexural strength was determined according to JIS R5201 "Physical Test Method for Cement" in the following manner.

At 1, 7 or 28 days after demolding, the measurement was conducted on 3 specimens and an average value was calculated. The distance between fulcra was set at 100 mm, and a load was imposed on the center of the side face of the specimen while increasing the load at a uniform rate of 5 Kg/sec, and the maximum load was determined. The flexural strength was calculated according to the following formula:

$$b = w \times 0.234$$

wherein b represents the flexural strength (Kg/cm$^2$) and w designates the maximum load (Kg).

(b) Compressive strength

The compressive strength was determined according to JIS R 5201 in the following manner.

The measurement was conducted on each of broken pieces of the three specimens cut at the above-mentioned flexural strength test, and an average value was calculated. Both the side faces of the packed specimen were pressed at the central portions thereof by using loading press boards while elevating the load at a uniform rate of 80 Kg/sec. The maximum load was determined, and the compressive strength was calculated according to the following formula:

$$C = w/16$$

wherein C represents the compressive strength (Kg/cm$^2$) and w denotes the maximum load (Kg).

(c) Flow value

The flow value was determined according to JIS R 5201 in the following manner.

A sample mortar in which mixing had been completed was filled in a flow cone, and the flow cone was placed on a flow table correctly at the center thereof. Then, the flow cone was taken away correctly upwardly and a falling movement was given 15 times during 15 seconds. The diameter of the expanded mortar was measured both in a direction in which the expansion was deemed to be largest and in a direction rectangular thereto. The average value expressed in the unit of mm was adopted as the flow value. The above flow test was subsequently conducted two times, and an average value was calculated.

(d) Porosity

The density $\rho_1$ at the mixing step was calculated from the total weight and volume of the ingredients, and the density $\rho_2$ of a specimen was calculated from the weight and volume of the molded specimen just after demolding. The porosity a was calculated according to the following formula:

$$a = (\rho_1 - \rho_2/\rho_1) \times 100\ (\%)$$

(e) Water absorption

After the flexural strength test, the specimen was dried at 80° C. overnight (about 18 hours) and then kept at 105° C. for 3 hours in oven, and the specimen was then dipped in water ($20° \pm 2°$ C.). The water absorption was then measured.

EXAMPLE 1

In a cement composition comprising 1000 parts of cement, 1000 parts of sand and 250 parts of water were incorporated 7.5 parts of high formaldehyde condensate of naphthalenesulfonate and a monomer (prepolymer) (10% by weight of cement). The flexural strength and compressive strength at 7 days were shown in the following Table, from which it is seen that a water-soluble epoxy compound gives good results.

Table 1

| Run No. | Monomer (Prepolymer) | Flow value | Flexural Strength (Kg/cm$^2$) | Compressive Strength (Kg/cm$^2$) |
|---|---|---|---|---|
| 1 | plain | 100 | 126 | 556 |
| 2 | plain (dispersant incorporated) | 133 | 144 | 730 |
| 3 | styrene | 159 | 118 | 500 |
| 4 | styrene + 2-ethylhexyl-acrylate (1:1) | 159 | 93 | 325 |
| 5 | styrene + divinylbenzene (95:5) | 155 | 108 | 548 |
| 6 | hydroxymethyl methacrylate | 174 | not cured | not cured |
| 7 | acylamide | 179 | not cured | not cured |
| 8 | N-methylol acrylamide | 146 | 13 | 32 |
| 9 | epoxy emulsion | 136 | 97 | 270 |
| 10 | vinyl acetate | 131 | 41 | 219 |
| 11 | vinyl propionate | 148 | not cured | not cured |
| 12 | acrylic acid | 112 | 17 | 41 |

Table 1-continued

| Run No. | Monomer (Prepolymer) | Flow value | Flexural Strength (Kg/cm$^2$) | Compressive Strength (Kg/cm$^2$) |
|---|---|---|---|---|
| 13 | acrylonitrile | 145 | 98 | 413 |
| 14 | polyvinyl chloride | 146 | 89 | 254 |
| 15 | polyethylene | 100 | 103 | 381 |
| 16 | sodium polyacrylate | 107 | 25 | 53 |
| 17 | urethane emulsion | 100 | 51 | 186 |
| 18 | water-insoluble epoxy resin | 123 | 136 | 373 |
| 19 | water-soluble epoxy resin (glyceryl diglycidyl ether) | 134 | 179 | 595 |

EXAMPLE 2

A water-insoluble epoxy resin and a water-soluble epoxy resin were separately incorporated in a cement composition in an amount of 10% by weight of cement and the effects of two types the epoxy resins were tested in order to study an optimum amount of an amine used as a curing agent. Obtained results are shown in the following Table.

In each run, the water/cement ratio (W/C) was 25% and the fine sand/cement ratio (S/C) was 1.0. The dosage of the superplasticizer (same as used in Example 1) was 0.75% by weight of cement. Data obtained at 7 days were shown.

Table 2

| Epoxy Resin/Curing Agent | Equivalent Ratio | Flow Value | Flexural Strength (Kg/cm$^2$) | Compressive Strength (Kg/cm$^2$) | Water absorption (%) (after 3 hours' dipping in water |
|---|---|---|---|---|---|
| bisphenol type epoxy resin/diethylene triamine | 1.0 : 0.8 | 117 | 111 | 347 | 1.0 |
| | 1.0 : 1.0 | 118 | 125 | 352 | 1.2 |
| | 1.0 : 1.2 | 119 | 126 | 354 | 1.5 |
| bisphenol type epoxy resin/triethylene tetramine | 1.0 : 1.2 | 117 | 124 | 333 | 2.3 |
| polyethylene glycol diglycidyl ether/triethylene tetramine | 1.0 : 1.0 | 131 | 175 | 294 | 1.6 |
| | 1.0 : 1.2 | 133 | 199 | 310 | 2.3 |
| | 1.0 : 1.5 | 127 | 187 | 305 | 2.1 |
| glycerin diglycidyl ether/triethylene tetramine | 1.0 : 1.0 | 129 | 151 | 381 | 2.4 |
| | 1.0 : 1.2 | 131 | 211 | 476 | 2.9 |
| | 1.0 : 1.5 | 125 | 221 | 508 | 2.8 |
| diglycerin triglycidyl ether/triethylene tetramine | 1.0 : 1.0 | 134 | 147 | 434 | 3.1 |
| | 1.0 : 1.2 | 136 | 222 | 582 | 2.6 |
| | 1.0 : 1.5 | 135 | 163 | 487 | 3.8 |
| plain (0.75% dispersant incorporated) | | 125 | 129 | 537 | 3.4 |

From the results shown above, it will readily be understood that in case of an ordinary bisphenol type epoxy resin, the flexural strength does not increase even with increasing amount of the curing agent. To the contrary, in case of a water-soluble epoxy resin, especially a glycerin type resin, both the flexural strength and the compressive strength increase with increasing amount of the curing agent, and reach the maximum at the ratio of the curing agent vs the epoxy resin of about 1.0 to 1.2.

EXAMPLE 3

Six water-soluble epoxy resins were separately incorporated into a cement composition comprising 1000 parts of cement, 1000 parts of sand, 250 parts of water, and 7.5 parts of a superplasticizer (high formaldehyde condensate of naphthalenesulfonate), and effects of these epoxy resins were compared with one another. As the curing agent for the water-soluble epoxy resin, triethylene tetramine was used at a molar ratio of 1/1.2 to the epoxy equivalent. Results are shown in Table 3. In each run, the improvement of the flexural strength was observed.

Table 3

| Water-Soluble Epoxy Resin | Flow Value | Flexural Strength (Kg/cm$^2$) | | | Compressive Strength (Kg/cm$^2$) | | | Water Absorption (%) (after 3 hours' dipping in water) | |
|---|---|---|---|---|---|---|---|---|---|
| | | 1 day | 7 days | 28 days | 1 day | 7 days | 28 days | 7 days | 28 days |
| plain (0.75% dispersant incorporated) | 125 | 93 | 129 | 152 | 376 | 537 | 619 | 3.4 | 2.5 |
| glyceryl diglycidyl ether | 127 | 100 | 194 | 215 | 312 | 516 | 529 | 1.6 | 2.0 |
| diglyceryl triglycidyl ether | 137 | 81 | 181 | 195 | 325 | 572 | 587 | 2.5 | 2.1 |
| polyethylene glycol diglycidyl ether | 134 | 80 | 155 | 200 | 191 | 333 | 500 | 2.1 | 1.5 |
| trimethylolpropane polyglycidyl ether | 124 | 76 | 173 | 189 | 238 | 429 | 592 | 2.2 | 2.2 |
| pentaerythritol polyglycidyl ether | 120 | 110 | 189 | 190 | 312 | 466 | 579 | 2.3 | 2.2 |
| sorbitol polyglycidyl ether | 134 | 81 | 171 | 176 | 259 | 418 | 484 | 2.5 | 2.4 |

EXAMPLE 4

The water/cement ratio was changed in a broad range of from 20 to 50 and also the sand/cement ratio (S/C) was simultaneously changed. Into the mortar compositions formulated in such manner, glyceryl diglycidyl ether was incorporated in an amount of 10% by weight of cement, and triethylene tetramine was further incorporated in an amount of 1.2 moles per epoxy equivalent. The effect of increase in flexural strength was studied and the results shown in Table 4.

Table 4

| W/C (%) | S/C | Dispersant* /C (%) | Epoxy /C (%) | Flow Value | Flexural Strength (Kg/cm²) | | | Compression Strength (Kg/cm²) | | | Water Absorption (%) (after 3 hours' dipping in water) |
|---|---|---|---|---|---|---|---|---|---|---|---|
| | | | | | 1 day | 7 days | 28 days | 1 day | 7 days | 28 days | 28 days |
| 50 | 2.0 | 0 | 0 | 150 | 31 | 80 | 103 | 82 | 349 | 492 | 6.3 |
| 50 | 2.0 | 0 | 10 | 176 | 34 | 105 | 140 | 53 | 265 | 418 | 4.0 |
| 40 | 1.5 | 0 | 0 | 150 | 42 | 102 | 108 | 233 | 489 | 584 | 5.2 |
| 40 | 1.5 | 0 | 10 | 180 | 57 | 135 | 168 | 103 | 386 | 497 | 3.5 |
| 30 | 1.5 | 3.0 | 0 | 157 | 64 | 125 | 130 | 233 | 537 | 608 | 3.3 |
| 30 | 1.5 | 3.0 | 10 | 138 | 76 | 151 | 175 | 211 | 417 | 522 | 2.2 |
| 25 | 1.0 | 0.75 | 0 | 125 | 92 | 129 | 152 | 376 | 537 | 619 | 2.5 |
| 25 | 1.0 | 0.75 | 10 | 130 | 94 | 188 | 192 | 310 | 508 | 571 | 1.8 |
| 20 | 1.0 | 0.75 | 0 | 100 | 92 | 156 | 155 | 426 | 567 | 683 | 2.7 |
| 20 | 1.0 | 0.75 | 10 | 104 | 128 | 226 | 231 | 373 | 569 | 624 | 2.1 |

*high formaldehyde condensate of naphthalene sulfonate.

From the results shown in the above Table, it has been confirmed that the flexural strength is improved throughout the whole range of the water/cement ratio but the compressive strength is reduced by 10 to 20% on account of water curing of the specimens.

EXAMPLE 5

Into 4 kinds of compositions with different water/cement ratio, and into composition which were formed by adding 0.75% of the superplasticizer by weight of cement (same as used in Example 1) to the above-mentioned compositions and reduced the water content so that the same slump value was attained, a mixture of glyceryl diglycidyl ether and triethylene tetramine (equivalent ratio=1.0:1.2) was added in an amount of 8.1 to 8.4% of the total volume. All specimens were cured in water and the strength was measured as shown in Table 5.

Table 5

| W/C (%) | S/C | Dispersant /C (%) | Epoxy /C | Flow Value | Flexural Strength (Kg/cm²) | | | Compressive Strength (Kg/cm²) | | | Water Absorption (%) (after 3 hours' dipping in water) |
|---|---|---|---|---|---|---|---|---|---|---|---|
| | | | | | 1 day | 7 days | 28 days | 1 day | 7 days | 28 days | 28 days |
| 25 | 1.0 | 0 | not added | 104 | 79 | 127 | 126 | 352 | 559 | 579 | 2.8 |
| 25 | 1.0 | 0 | added | 127 | 80 | 161 | 155 | 283 | 421 | 455 | 1.9 |
| 25 | 1.0 | 0.75 | not added | 131 | 93 | 134 | 146 | 466 | 619 | 768 | 2.1 |
| 25 | 1.0 | 0.75 | added | 134 | 86 | 186 | 178 | 299 | 503 | 532 | 1.9 |
| 40 | 1.5 | 0 | not added | 152 | 38 | 89 | 97 | 164 | 421 | 540 | 4.3 |
| 40 | 1.5 | 0 | added | 189 | 62 | 120 | 160 | 154 | 318 | 487 | 2.8 |
| 33.5 | 1.5 | 0.75 | not added | 159 | 70 | 106 | 108 | 317 | 532 | 635 | 2.6 |
| 33.5 | 1.5 | 0.75 | added | 154 | 75 | 143 | 187 | 230 | 386 | 535 | 2.0 |
| 60 | 2.35 | 0 | not added | 160 | 19 | 58 | 74 | 48 | 235 | 307 | 7.6 |
| 60 | 2.35 | 0 | added | 203 | 44 | 82 | 108 | 66 | 188 | 297 | 3.2 |
| 54.5 | 2.35 | 0.75 | not added | 160 | 29 | 69 | 79 | 71 | 283 | 373 | 6.4 |
| 54.5 | 2.35 | 0.75 | added | 187 | 48 | 91 | 123 | 101 | 249 | 336 | 4.0 |

As shown in the above Table, the reduction of the compressive strength by addition of the water-soluble epoxy resin can be prevented by reducing the water content by the use of a superplasticizer.

EXAMPLE 6

Experiments were carried out in the same manner as described in Example 5 except that air curing was conducted, and the strength was measured as shown in Table 6.

Table 6

| W/C (%) | S/C | Dispersant /C (%) | Epoxy /C (%) | Flow Value | Flexural Strength (Kg/cm²) | | | Compressive Strength (Kg/cm²) | | | Water Absorption (%) (after 3 hours' dipping in water) |
|---|---|---|---|---|---|---|---|---|---|---|---|
| | | | | | 3 days | 7 days | 28 days | 3 days | 7 days | 28 days | 28 days |
| 30 | 0.75 | 0 | 0 | 161 | 62 | 64 | 82 | 413 | 487 | 545 | 6.5 |
| 30 | 0.75 | 0 | 9.6 | 177 | 80 | 71 | 186 | 352 | 424 | 648 | 2.2 |
| 26.5 | 0.75 | 0.75 | 0 | 158 | 66 | 74 | 94 | 458 | 511 | 545 | 5.5 |
| 26.5 | 0.75 | 0.75 | 9.2 | 149 | 92 | 73 | 180 | 392 | 457 | 738 | 1.7 |
| 40 | 1.5 | 0 | 0 | 158 | 44 | 52 | 84 | 258 | 281 | 360 | 8.3 |
| 40 | 1.5 | 0 | 13.8 | 189 | 71 | 87 | 138 | 241 | 310 | 527 | 1.3 |
| 34 | 1.5 | 0.75 | 0 | 161 | 65 | 70 | 105 | 333 | 365 | 389 | 6.2 |
| 34 | 1.5 | 0.75 | 13.1 | 149 | 88 | 100 | 192 | 365 | 410 | 656 | 0.8 |
| 50 | 1.95 | 0 | 0 | 159 | 38 | 44 | 69 | 122 | 198 | 254 | 9.8 |
| 50 | 1.95 | 0 | 16.4 | 196 | 64 | 75 | 119 | 178 | 262 | 421 | 1.3 |
| 43.5 | 1.95 | 0.75 | 0 | 161 | 44 | 63 | 75 | 201 | 258 | 281 | 8.4 |
| 43.5 | 1.95 | 0.75 | 15.7 | 162 | 76 | 91 | 168 | 267 | 336 | 516 | 1.2 |
| 60 | 2.35 | 0 | 0 | 156 | 27 | 32 | 61 | 69 | 124 | 188 | 10.6 |
| 60 | 2.35 | 0 | 19.3 | 204 | 50 | 63 | 119 | 127 | 211 | 352 | 1.6 |

Table 6-continued

| W/C (%) | S/C | Dispersant /C (%) | Epoxy /C (%) | Flow Value | Flexural Strength (Kg/cm$^2$) 3 days | 7 days | 28 days | Compressive Strength (Kg/cm$^2$) 3 days | 7 days | 28 days | Water Absorption (%) (after 3 hours' dipping in water) 28 days |
|---|---|---|---|---|---|---|---|---|---|---|---|
| 54.5 | 2.35 | 0.75 | 0 | 162 | 34 | 46 | 64 | 111 | 138 | 196 | 10.3 |
| 54.5 | 2.35 | 0.75 | 18.6 | 176 | 65 | 85 | 157 | 196 | 262 | 450 | 1.5 |

From the results shown in the above Table, it will readily be understood that when air curing is conducted, dissolution of the water-soluble epoxy resin into water, as observed in case of water curing, can be avoided and, therefore, the synergistic effect of the superplasticizer, water-soluble epoxy resin and aliphatic polyvalent amine can be demonstrated more prominently to improve both the flexural strength and compressive strength conspicuously.

EXAMPLE 7

Superplasticizers were compared with ordinary cement dispersants with respect to the effects attained by the combined use with a water-soluble epoxy resin under such conditions that the flow value was about 160. In each run, air curing was conducted.

Table 7

| W/C (%) | S/C | Dispersant /C (%) | Epoxy /C (%) | Flow Value | Flexural Strength (Kg/cm$^2$) 1 day | 7 days | 28 days | Compressive Strength (Kg/cm$^2$) 1 day | 7 days | 28 days | Water Absorption (%) (after 3 hours' dipping in water) 28 days |
|---|---|---|---|---|---|---|---|---|---|---|---|
| (1) plain | | | | | | | | | | | |
| 60 | 2.3 | 0 | 0 | 159 | 17 | 41 | 52 | 58 | 183 | 210 | 10.0 |
| 48.5 | 2.3 | 0 | 18.6 | 156 | 24 | 54 | 74 | 84 | 214 | 294 | 2.2 |
| (2) naphthalene-sulfonic acid-formaldehyde high condensate salt | | | | | | | | | | | |
| 54.5 | 2.3 | 0.75 | 0 | 161 | 22 | 49 | 70 | 66 | 222 | 265 | 8.4 |
| 48.5 | 2.3 | 0.75 | 18.6 | 158 | 53 | 105 | 155 | 143 | 353 | 535 | 0.9 |
| (3) creosote oil-sulfonic acid-formaldehyde condensate salt | | | | | | | | | | | |
| 54.5 | 2.3 | 0.45 | 0 | 159 | 20 | 43 | 54 | 65 | 182 | 211 | 9.3 |
| 48.5 | 2.3 | 0.45 | 18.6 | 157 | 47 | 97 | 145 | 137 | 348 | 529 | 0.6 |
| (4) melamine-sulfonic acid-formaldehyde condensate salt | | | | | | | | | | | |
| 54.5 | 2.3 | 1.5 | 0 | 154 | 29 | 55 | 73 | 81 | 257 | 310 | 8.0 |
| 48.5 | 2.3 | 1.5 | 18.6 | 161 | 47 | 102 | 146 | 134 | 360 | 557 | 0.7 |
| (5) lignin-sulfonic acid (25% CaCl$_2$ . 2H$_2$O incorporated) | | | | | | | | | | | |
| 54.5 | 2.3 | 0.25 | 0 | 157 | 17 | 39 | 47 | 49 | 166 | 178 | 10.1 |
| 48.5 | 2.3 | 0.25 | 18.6 | 156 | 38 | 90 | 139 | 104 | 338 | 520 | 0.7 |

As shown in the above Table, when an ordinary cement dispersant (lignin-sulfonate) is used as the cement dispersant, both the flexural strength and the compressive strength can be improved by the synergistic effect between a water-soluble epoxy resin and an aliphatic polyvalent amine as in case of superplasticizers (such as high formaldehyde condensate of naphthalene sulfonate, formaldehyde condensate of creosote oil sulfonate, and formaldehyde condensate of melamine sulfonate), and the hardened cement product excellent in the water tightness can be obtained.

The embodiments of the invention in which an exclusive privilege or property is claimed are defined as follows:

1. A method for preparing a product made of hydraulic cement composition which product possesses increased flexural strength, which comprises the steps of: blending in a cementitious composition comprising hydraulic cement and an amount of water effective to harden said hydraulic cement, (1) from 5 to 30% by weight, based on the weight of said hydraulic cement, of water-soluble epoxy resin which is a polyglycidyl ether of a polyhydric alcohol selected from the group consisting of glycerin, diglycerin, polyglycerin, sorbitol, mannitol, trimethylol propane, pentaerythritol and polyethylene glycol, in which a part of the hydroxyl groups of said polyhydric alcohol is unreacted so that said polyglycidyl ether is water soluble, (2) from 1 to 1.5 moles, per epoxy equivalent of said water-soluble epoxy resin, of polyalkylene polyamine effective as a curing agent for said water-soluble epoxy resin, and (3) from 0.1 to 10% by weight, based on the weight of said hydraulic cement, of cement dispersant having a water reduction ratio of at least 20%; and then hardening the composition.

2. A method according to claim 1 in which said cement dispersant is selected from the group consisting of formaldehyde condensate of naphthalene sulfonate, formaldehyde condensate of melamine sulfonate and formaldehyde condensate of creosote oil sulfonate.

3. A method according to claim 1 in which said cement dispersant is formaldehye condensate of naphthalene sulfonate.

4. A method according to claim 2 in which said water-soluble epoxy resin is selected from the group consisting of polyethylene glycol diglycidyl ether, glyceryl diglycidyl ether, diglyceryl triglycidyl ether, trimethylolpropane polyglycidyl ether, pentaerythritol polyglycidyl ether and sorbitol polyglycidyl ether.

5. A method according to claim 3 in which said water-soluble epoxy resin is glyceryl diglycidyl ether.

6. A method according to claim 4 in which said polyalkylene polyamine is selected from the group consisting of diethylene triamine and triethylene tetramine.

7. A method according to claim 5 in which said polyalkylene polyamine is triethylene tetramine.

8. A method according to claim 1 in which the amount of said water-soluble epoxy resin is from 10 to 20% by weight, based on the weight of said hydraulic cement.

* * * * *